United States Patent [19]

Liu et al.

[11] Patent Number: 5,098,791

[45] Date of Patent: Mar. 24, 1992

[54] SUBSTRATE COATED WITH EPOXY VINYL ETHER

[75] Inventors: Kou-Chang Liu, Wayne; Fulvio J. Vara, Chester; James A. Dougherty, Pequannock, all of N.J.

[73] Assignee: ISP Investments Inc., Wilmington, Del.

[21] Appl. No.: 565,609

[22] Filed: Aug. 10, 1990

Related U.S. Application Data

[60] Division of Ser. No. 481,084, Feb. 16, 1990, Pat. No. 4,980,428, which is a continuation-in-part of Ser. No. 424,453, Oct. 20, 1989, abandoned.

[51] Int. Cl.$^5$ .................. B32B 15/08; B32B 17/10; B32B 21/08
[52] U.S. Cl. .................. 428/417; 428/418; 525/502; 525/529
[58] Field of Search .............. 525/502, 529; 428/417, 428/418

[56] References Cited

U.S. PATENT DOCUMENTS 4,347,343  8/1982  Brewbaker .................. 525/531

OTHER PUBLICATIONS

Lapin, "Electron Beam Activated Cationic Curing of Vinyl Ethers," Radcure '86: Conference Proceedings of *Association for Finishing Processes*, Baltimore, MD, 1986, pp. 15-15 to 15-26.

Lapin, "Vinyl Ether Functionalized Urethane Oligomers . . . ," Radtech '88: N. America Conference Proceedings of *Radtech. Int.*, New Orleans, LA, 1988, pp. 395-404.

Nara et al., "Vinyl Ether in UV and EB Induced Cationic Curing," Radcure '86: Conference Proceedings of *Assn. For Finishing Processes*, 1986, Baltimore, MD, 11 pages.

Nelson et al., "Regulatory Restrictions on Commerializing New Chemicals," Radtech '88: Conference Proceedings of *Radtech Int.*, New Orleans, LA, 1988, pp. 120-126.

*Primary Examiner*—John C. Bleutge
*Assistant Examiner*—Robert E. Lee Sellers, II
*Attorney, Agent, or Firm*—Marilyn J. Maue; Joshua J. Ward

[57] ABSTRACT

This invention relates to epoxy vinyl ethers having the formula:

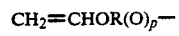

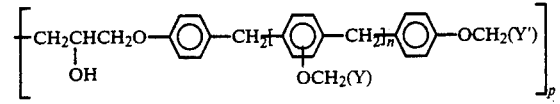

wherein R is a polyvalent linear, branched or cyclic hydrocarbon radical having from 2 to 20 carbon atoms, optionally substituted with alkyleneoxy; n has a value of from 1 to 20; p has a value of from 1 to 6; and at least one of Y and Y' is

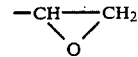

while any remaining Y and Y' can be

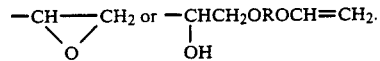

The invention also relates to the synthesis and uses of the above polyphenyl vinyl ethers.

2 Claims, No Drawings

SUBSTRATE COATED WITH EPOXY VINYL ETHER

This is a division of application Ser. No. 481,084, filed Feb. 16, 1990, now U.S. Pat. No. 4,980,428, which is a continuation-in-part of application Ser. No. 424,453, filed Oct. 20, 1989, now abandoned.

In one aspect the invention relates to novel polyphenyl vinyl ethers which are rapidly curable by cationic radiation to durable protective coatings or films having high resistance to abrasion and chemical attack. In another aspect the invention relates to polyphenyl vinyl ethers as reactive monomers in the curing of vinyl ether, epoxy or acrylate monomers or polymers. In still another aspect, the invention relates to a method of synthesizing the present polyphenyl vinyl ethers.

BACKGROUND OF THE INVENTION

Certain radiation curable coatings and films such as those formed from the acrylates, particularly propane trimethanol triacrylate, trimethacrylate, pentaerythritol triacrylate, and hexanediol diacylate or methacrylate, are in great demand because of their rapid curing properties.

Since acrylate compounds are not conducive to cationically induced radiation curing, they require more costly free radical systems which are oxygen inhibited unless effected in an inert atmosphere, generally under a blanket of nitrogen. Although formulation with a photoinitiator which undergoes bimolecular reaction with a hydrogen donor minimizes the inhibitory effect of air, this benefit is realized at the expense of a greatly reduced cure rate. Also, it is found that polymerization or curing in free radical systems ceases almost immediately upon removal from the source of radiation; thus, the cured product likely contains significant amounts of unpolymerized components. Accordingly, it is an aim of research to develop a compound having the beneficial properties of acrylates but which is amenable to radiation curing at a rapid rate by cationically induced polymerization which is not oxygen inhibited and which permits continued polymerization after removal from the source of radiation exposure.

Finally, it is noted that the unsubstituted acrylates are sensitizers and skin irritants as well as being carcinogenic, so that specialized safety precautions must be taken to protect operators from exposure. Although alkoxylation has lessened irritancy of the acrylates, their carcinogenic properties are not reduced.

Accordingly, it is an object of this invention to overcome or minimize the above described deficiencies and to provide oligomeric materials capable of altering the curing characteristics of vinyl ether, epoxy and acrylate monomers and polymers.

Another object of this invention is to provide an economical and commercially feasible process for synthesizing radiation curable epoxy vinyl ethers.

Still another object of this invention is to provide compounds which possess good photoresist properties.

Another object is to provide a homopolymerizable compound readily curable by cationic radiation to a hard coating or film which is resistant to chemical attack.

These and other objects of the invention will become apparent from the following description and disclosure.

THE INVENTION

According to this invention there is provided an epoxy vinyl ether having the formula

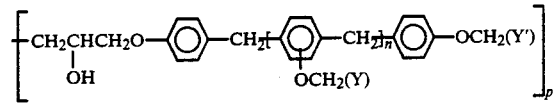

wherein R is a polyvalent linear, branched or cyclic hydrocarbon radical having from 2 to 20 carbon atoms, optionally substituted with alkyleneoxy; n has a value of from 1 to 20; p has a value of from 1 to 6; and at least one of Y and Y' is

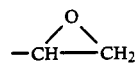

while each of any remaining Y and Y' can be

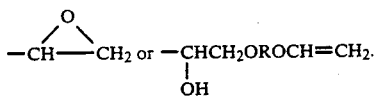

Of the above defined polyphenyl vinyl ethers, those wherein R is $C_2$ to $C_6$ alkylene, n has a value of from 1 to 12 and Y and Y' are

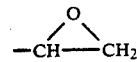

are preferred. Most preferred of this group are those compounds where n and p have a value of from 1 to 4.

The synthesis of the above epoxy vinyl ethers involves the reaction of a hydroxylated vinyl ether reactant, $(HO)_p ROCH=CH_2$, and a polyepoxy aryl hydroxyalkyl ether coreactant, of the formula

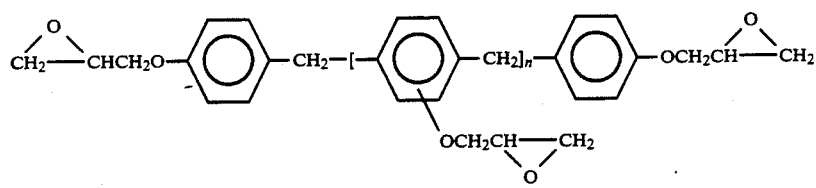

wherein R, p and n are as defined.

The amounts of reactant and coreactant employed in the synthesis process to produce the epoxy polyphenyl product are critical. Specifically, the total number of epoxy groups,

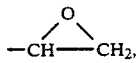

with respect to the total amount of —OH groups in the system, must be in excess of at least one. For example, as an upper limit, when n is 20 and p is 1, there can be 21 epoxy GROUPS/OH. In the later case, where p is 1, only one epoxy group, of the original 22 epoxy groups, reacts. When a polyhydroxylated reactant is employed, e.g. $(HO)_3ROCH=CH_2$, and n has a positive value, e.g. 2, the ratio of reactant to coreactant is 1:1, whereby the product has one unreacted epoxy group; however when 2 moles of the coreactant to 1 mole of the reactant is employed, the product contains 5 unreacted epoxy groups. In another case where $(HO)_3ROCH=CH_2$ is the reactant and n in the coreactant is 6, the ratio of reactant to coreactant can vary from 1:0.5, where the product contains 1 remaining epoxy group, up to 1:1 where the product contains 5 remaining epoxy groups. Hence by controlling the amount of reactant to coreactant, or vice versa, all of the hydroxy groups of the hydroxylated vinyl ether will be reacted and the product will always contain at least one epoxy group. It is essential to retain an epoxy group in the product where derivatives of the present products are desired.

The reaction can be carried out in the presence of air or in the absence of oxygen under a blanket of inert gas. Generally, the present condensation reaction is carried out at a temperature of between about 100° and about 175° C. under atmospheric pressure for a period of from 0.5 to 200 hours. Preferred reaction parameters include a temperature of from about 120° to about 160° C. for a period of from about 2 to about 100 hours.

The reaction is also conducted in the presence of a base catalyst such as particulate sodium, potassium, or lithium metal, sodium or potassium hydroxide or hydride. The catalyst is present in an amount of from about 0.01 to about 2 wt. %, preferably from about 0.1 to about 1 wt. % of the total mixture. When the reactants and products included herein are liquids, they are generally synthesized in the absence of diluents or solvents which are otherwise required for more viscous or solid reactants.

Suitable hydroxylated vinyl ether reactants include the mono vinyl ether of cyclohexanetrimethanol, tetra(hydroxyethyl) vinyloxy hexane, (2-hydroxyethyl) vinyl ether, (3-hydroxypropyl) vinyl ether, the monovinyl ether of 3-ethyl-1,6-hexanediol, (4-hydroxybutyl) vinyl ether, the monovinyl ether of cyclohexanediamethanol, the monovinyl ether of tris(hydroxymethyl) ethane, the divinyl ether of 2-ethyl-2-(hydroxymethyl)1,3-propanediol, the divinyl ether of tris(hydroxymethyl) ethane, the monovinyl ether of 2-methyl-1,8-octanediol, (vinyloxy) cresol, (vinyloxy) xylol and alkoxylated derivatives thereof containing from 1 to 6 ethyleneoxy or propyleneoxy units. Suitable aromatic polyepoxy reactants include the terminally substituted diepoxy compounds of propyl epoxy derivatives of novolac resins.

Commercially available polyepoxy reactants suitable for use in the present reaction include D.E.N. epoxy Novolac resins (supplied by Dow Chemical Company) and the like. These epoxy reactants are readily prepared by well known procedures, such as the procedure outlined on pages 10 through 21 of Chapter 2 of HANDBOOK OF EPOXY RESINS by Henry Lee and Kris Neville, published by McGraw Hill Book Company, 1967.

The products of this invention can be homopolymerized to hard chemically resistant films and coatings which have good substrate substantivity. Alternatively, the present compounds, particularly the polyepoxide products, can be mixed with alkenyl ether, alkenyl ester, epoxide or acrylate monomers or polymers to impart rapid radiation curing properties in the presence of a cationic photoinitiator. Cross-linking copolymerizations can be carried out in the presence of air to produce highly desirable films and coatings which retain the desirable properties of both monomers or their polymerized derivatives. Curable compositions containing between about 0 and about 80% of a vinyl ether, an epoxide, an acrylate or a methacrylate comonomer or a polymer thereof and between about 20% and about 100% of the present epoxy vinyl ether in the presence of from about 0.05 to about 5 wt. % of a photoinitiator are suitable radiation curable coatings which are polymerized by exposure to UV light, electron beam, lazer emission or other source of radiation. Between about 2 and about 50 wt. % of the present product with from about 0.1 to about 5 wt. % of a conventional cationic photoinitiator, such as an onium salt including the triphenyl sulfonium salt of phosphorous hexafluoride, diphenyl iodium salt, tetrazolium chloride, phenyl onium salts or aryl alkyl onium salts cationic initiators and/or free radical initiators such as 1-hydrocyclohexyl phenyl ketone (e.g. IRGACURE 184), 2-hydroxy-2-methyl-1-phenyl-1-propan-1-one (DAROCUR 1173), 2,2-dichloro-1-(4-phenoxyphenyl) ethanone (SANDORAY 1000) and other free radical and cationic initiators which are suitably employed in this invention, as described by M. J. M. Abadie, Advantages and Development of Photochemical Initiators, in the European Coatings Journal 5/1988 pages 350-358, can be admixed with an acrylic compound normally not conducive to rapid cationic radiation curing, such as an acrylate or methacrylate comonomer, to effect curing within a few seconds exposure to a source of radiation. These coatings are applied to a substrate such as glass, ceramic, wood, plastic, metal and the like in thicknesses of from about 0.1 to about 5 mils. Additionally, the compounds of this invention, because of their sensitivity to polymerization by radiation, find application as photoresist materials.

Curing of the present compounds or their admixtures with comonomers can be effected in less than 1 second by exposure to between about 100 and about 800 millijoules/cm² of UV light, between about 0.5 and about 5 megarads of electron beam exposure or equivalent radiation exposures.

Having generally described the invention reference is now had to the accompanying examples which illustrate preferred embodiments which are not to be construed as limiting to the scope of the invention more broadly defined above and in the appended claims.

EXAMPLE 1

D.E.N. 438 Epoxy Novolac Resin (1095 g.), 4-hydroxybutyl vinyl ether (446.5 g.) and potassium hydroxide 1.0 g. were charged into a 2-liter flask equipped with a mechanical stirrer, nitrogen inlet, thermometer, a condenser and a drying tube. The solution was heated at 150° C. for 72 hours under a blanket of nitrogen. Greater than 90% conversion to a gel-like product comprising

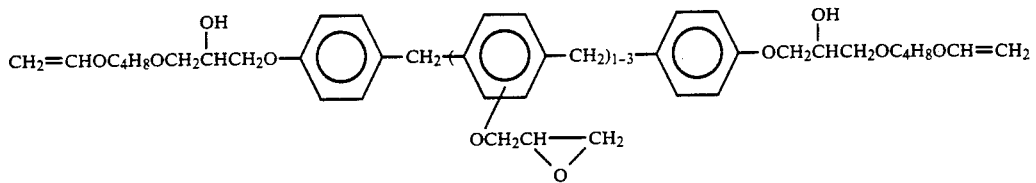

was obtained.

EXAMPLE 2

D.E.N. 439 Epoxy Novolac Resin (1231.2 g.), the monovinyl ether of triethylene glycol (352.3 g.) and 3 g. of potassium hydroxide are charged into a 2-liter flask. The solution is heated at 120° C. for 24 hours and then at 150° C. for 72 hours. Greater than 90% conversion to a gel-like product comprising

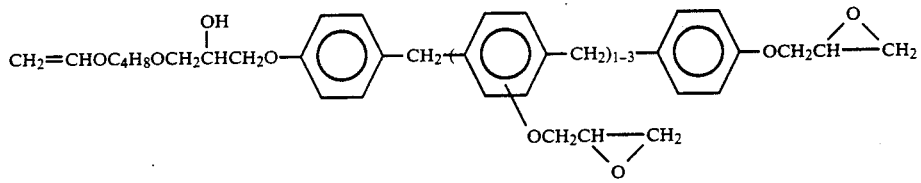

was obtained.

What is claimed is:

1. A substrate coating with a chemically resistant cured layer of the compound

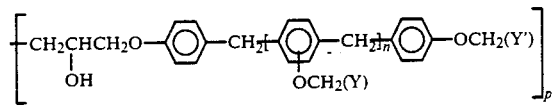

wherein R is a polyvalent linear, branched or cyclic hydrocarbon or alkoxylated hydrocarbon radical having from 2 to 20 carbon atoms, n has a value of from 1 to 20; p has a value of from 1 to 6 and at least one of Y and Y' is

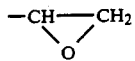

while any remaining Y and Y' can be

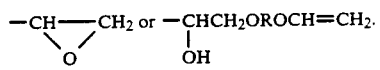

2. A substrate having coated on its surface an effective chemically resistant layer comprising a mixture of from about 20 to about 100% of the compound of claim 1 and from about 0 to about 80% of a polymerizable comonomer selected from the group consisting of a hydroxylated vinyl ether other than the compound of claim 12, a polyepoxide, an acrylate and methylmethacrylate.

* * * * *